US009153253B2

(12) United States Patent
Yamaguchi et al.

(10) Patent No.: US 9,153,253 B2
(45) Date of Patent: Oct. 6, 2015

(54) PERPENDICULAR MAGNETIC RECORDING HEAD AND MAGNETIC RECORDING UNIT HAVING LEADING SHIELD INCLUDING EXPOSED END SURFACE AND RECESS SHIELD INCLUDING MID PART (71) Applicant: TDK CORPORATION, Tokyo (JP)

(72) Inventors: Atsushi Yamaguchi, Tokyo (JP); Atsushi Matsuo, Tokyo (JP); Yuji Matsuura, Tokyo (JP); Michitaka Nishiyama, Tokyo (JP); Yumiko Yokoyama, Tokyo (JP)

(73) Assignee: TDK CORPORATION, Tokyo (JP)

( * ) Notice: Subject to any disclaimer, the term of this patent is extended or adjusted under 35 U.S.C. 154(b) by 74 days.

(21) Appl. No.: 14/150,259

(22) Filed: Jan. 8, 2014

(65) Prior Publication Data

US 2015/0194169 A1 Jul. 9, 2015

(51) Int. Cl.
G11B 5/11 (2006.01)
G11B 5/147 (2006.01)
G11B 5/127 (2006.01)
G11B 5/60 (2006.01)
G11B 5/31 (2006.01)

(52) U.S. Cl.
CPC .............. *G11B 5/1278* (2013.01); *G11B 5/11* (2013.01); *G11B 5/315* (2013.01); *G11B 5/6082* (2013.01)

(58) Field of Classification Search
CPC ........ G11B 5/11; G11B 5/3143; G11B 5/3146; G11B 5/315; G11B 5/127; G11B 5/1278; G11B 5/147; G11B 5/187; G11B 5/31; G11B 5/3109
USPC ............... 360/125.3, 125.02, 125.03, 125.16, 360/125.71
See application file for complete search history.

(56) References Cited

U.S. PATENT DOCUMENTS

| 8,300,357 | B1 | 10/2012 | Sasaki et al. | |
| 8,470,186 | B2* | 6/2013 | Chen et al. | 216/22 |
| 8,524,095 | B2* | 9/2013 | Hong et al. | 216/22 |
| 2005/0068678 | A1 | 3/2005 | Hsu et al. | |
| 2007/0268626 | A1* | 11/2007 | Taguchi et al. | 360/126 |
| 2009/0147410 | A1* | 6/2009 | Jiang et al. | 360/319 |
| 2010/0232062 | A1* | 9/2010 | Gao et al. | 360/123.12 |
| 2011/0151279 | A1* | 6/2011 | Allen et al. | 428/815 |
| 2011/0157746 | A1* | 6/2011 | Hirata et al. | 360/119.04 |
| 2013/0335854 | A1* | 12/2013 | Etoh et al. | 360/75 |
| 2014/0063657 | A1* | 3/2014 | Gao et al. | 360/119.02 |

* cited by examiner

*Primary Examiner* — Jefferson Evans
(74) *Attorney, Agent, or Firm* — Oliff PLC (57) ABSTRACT The perpendicular magnetic recording head includes: a magnetic pole including an end surface exposed on an air bearing surface, and extending in a height direction perpendicular to the air bearing surface; a leading shield including an end surface exposed on the air bearing surface; a leading gap provided between the magnetic pole and the leading shield; and a recess shield including a mid-part and other parts, and provided at a position on a side opposite to the magnetic pole with the leading shield in between, the mid-part being distanced from the leading shield in a track width direction, the other parts being in contact with the leading shield, and the position being recessed from the air bearing surface.

7 Claims, 11 Drawing Sheets

PERPENDICULAR MAGNETIC RECORDING HEAD AND MAGNETIC RECORDING UNIT HAVING LEADING SHIELD INCLUDING EXPOSED END SURFACE AND RECESS SHIELD INCLUDING MID PART

BACKGROUND OF THE INVENTION

1. Field of the Invention

The invention relates to a perpendicular magnetic recording head and a magnetic recording unit mounted with the perpendicular magnetic recording head.

2. Description of Related Art

In recent years, along with an increased surface recording density in a magnetic recording medium (hereinafter, referred to as a "recording medium") represented by a hard disk, a perpendicular magnetic recording system in which a direction of a signal magnetic field is set to a direction intersecting with a surface of the recording medium is a main stream as a recording system of a magnetic recording head. This is because a line recording density thereof is advantageously higher than that in a longitudinal magnetic recording system in related art, and a recorded recording medium is advantageously less affected by thermal fluctuation.

A magnetic recording head of the perpendicular magnetic recording system (hereinafter, referred to as "perpendicular magnetic recording head") has a main magnetic pole that guides a magnetic flux generated in a thin film coil to a recording medium, and the main magnetic pole has a tip section (a magnetic pole) that emits a magnetic flux to generate a recording magnetic field (a perpendicular magnetic field) and has a narrow width.

In these days, demand to further improve the surface recording density of the magnetic recording medium shows tendency to further increase. Under such circumstances, to obtain recording performance of the perpendicular magnetic recording head stably, for example, it is necessary to suppress WATE (wide adjacent track erase) effective magnetic field as much as possible. This is because, if the WATE effective magnetic field is not sufficiently suppressed, defect in which information recorded in adjacent tracks is unintentionally overwritten with false information may occur. The WATE effective magnetic field means effective magnetic field affecting adjacent tracks within a wide range (for example, two to ten tracks adjacent to a track to be written), out of recording magnetic field emitted from an air bearing surface toward the magnetic recording medium.

To achieve the above-described suppression, there is proposed a configuration in which a shield is so provided as to surround right, left, top, and bottom of the main magnetic pole or a magnetic circuit is provided both on a trailing side of the main magnetic pole and a leading side of the main magnetic pole (for example, U.S. Patent Application Publication No. 2005/0068678 specification). Further, there is also proposed a configuration in which part exposed on the air bearing surface is limited, and the magnetic circuit is partially distanced from the air bearing surface.

However, the configuration as described above causes complexity in manufacturing process thereof in many cases. Further, in a case of a configuration in which a part of a leading shield is recessed from the air bearing surface, the length of the magnetic path on the leading side becomes long, which causes degradation in magnetization efficiency. Moreover, when a magnetic circuit exists on the leading side, many of the magnetic flux of the recording magnetic field emitted from the main magnetic pole returns to the leading shield, which may cause deterioration in recording performance.

Based on these backgrounds, it is desirable to provide a perpendicular magnetic recording head and a magnetic recording unit that are capable of dealing with higher density recording while suppressing incorrect writing to adjacent tracks, and is excellent in manufacturability.

SUMMARY OF THE INVENTION

A perpendicular magnetic recording head according to an embodiment of the invention includes: a magnetic pole including an end surface exposed on an air bearing surface, and extending in a height direction perpendicular to the air bearing surface; a leading shield including an end surface exposed on the air bearing surface; a leading gap provided between the magnetic pole and the leading shield; and a recess shield including a mid-part and other parts, and provided at a position on a side opposite to the magnetic pole with the leading shield in between, the mid-part being distanced from the leading shield in a track width direction, the other parts being in contact with the leading shield, and the position being recessed from the air bearing surface.

A magnetic recording unit according to an embodiment of the invention includes a magnetic recording medium and the above-described perpendicular magnetic recording head.

In the perpendicular magnetic recording head and the magnetic recording unit according to the respective embodiments of the invention, the recess shield is distanced from the leading shield at the mid-part in the track width direction, and is in contact with the leading shield at the other parts. Accordingly, it is possible to suppress returning of the magnetic flux from the magnetic pole to the leading shield without lengthening the length of a magnetic path. In addition, the recess shield is provided at a position recessed from the air bearing surface. Therefore, spreading of the magnetic flux returned from the magnetic recording medium is suppressed, and occurrence probability of a part that causes WATE is suppressed. It is possible to deal with higher density recording while suppressing incorrect writing to adjacent tracks.

DETAILED DESCRIPTION OF THE PREFERRED EMBODIMENTS

Hereinafter, an embodiment of the invention will be described in detail with reference to drawings.

[Configuration of Magnetic Recording-Reproducing Unit]

Figure 1:
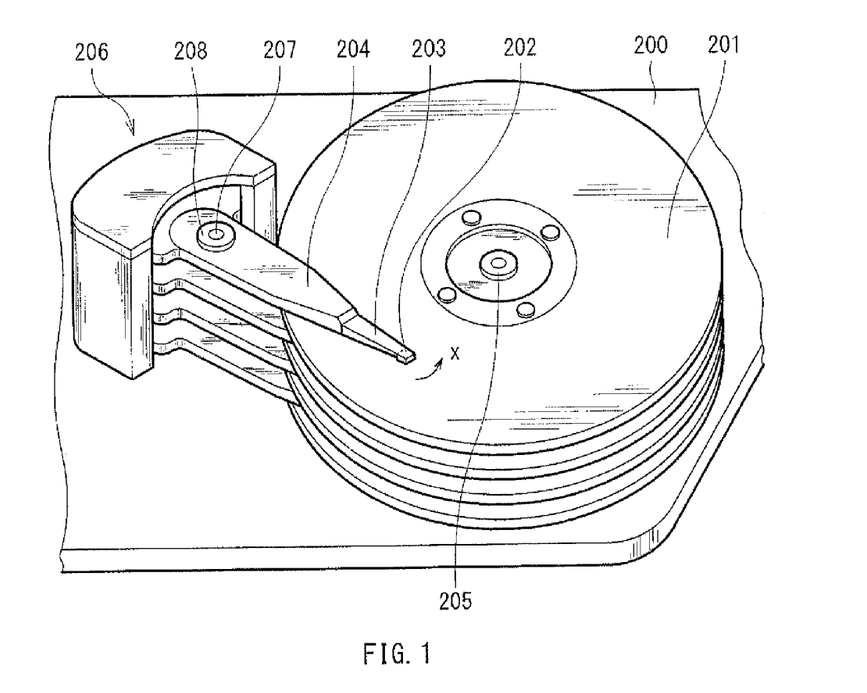
FIG. 1 is a perspective view illustrating a configuration of a magnetic recording-reproducing unit as an embodiment of the invention.
Figure 2:
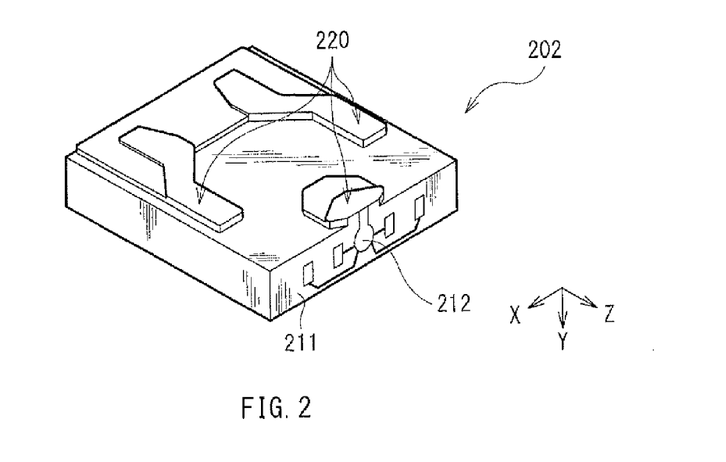
FIG. 2 is a perspective view illustrating a configuration of a main part of FIG. 1 in an enlarged manner.

First, with reference to FIG. 1 and FIG. 2, a configuration of a magnetic recording-reproducing unit mounted with a thin film magnetic head is described. FIG. 1 illustrates a perspective configuration of an entire magnetic recording-reproducing unit, and FIG. 2 illustrates a perspective configuration of a main part of the magnetic recording-reproducing unit.

The magnetic recording-reproducing unit may be, for example, a hard disk drive, and may include, inside of a housing 200, a plurality of magnetic disks (hard disks) 201 as magnetic recording media, a plurality of suspensions 203 that is disposed to correspond to the magnetic disks 201 and each has one end supporting a magnetic head slider 202, and a plurality of arms 204 each supporting the other end of each of the suspensions 203, as illustrated in FIG. 1. The magnetic disk 201 is rotatable around a spindle motor 205 fixed to the housing 200. The arm 204 is connected to a drive section 206 serving as a power source, and is pivotable around a fixed shaft 207 fixed to the housing 200 through a bearing 208. The drive section 206 may include, for example, a drive source such as a voice coil motor. The magnetic recording-reproducing unit may be, for example, a model in which the plurality of arms 204 is integrally pivotable around the fixed shaft 207. Incidentally, in FIG. 1, the housing 200 is partially cut out to facilitate visualization of an inner configuration of the magnetic recording-reproducing unit.

In addition, although four magnetic disks 201 are illustrated in FIG. 1, the number of the magnetic disks 201 is not specifically limited and may be one. The detailed configuration of the magnetic disk 201 will be described later.

As illustrated in FIG. 2, for example, the magnetic head slider 202 may be configured by forming a thin film magnetic head 212 as the above-described thin film magnetic head on one surface of a base material 211 that has a substantially rectangular parallelepiped structure formed of a non-magnetic insulating material such as AlTiC ($Al_2O_3 \cdot TiC$). For example, a concavo-convex structure to reduce air resistance generated at the time when the arm 204 pivots may be provided on one surface (the air bearing surface 220) of the base material 211, and the thin film magnetic head 212 is formed on the other surface (a surface on a front right side in FIG. 2) orthogonal to the air bearing surface 220. When the magnetic disk 201 rotates at the time of recording or reproducing information, the magnetic head slider 202 floats above a recording surface (a surface facing the magnetic head slider 202) of the magnetic disk 201 by using air flow generated between the recording surface of the magnetic disk 201 and the air bearing surface 220. Note that, in FIG. 2, the magnetic head slider 202 upside down from the state of FIG. 1 is illustrated to facilitate visualization of the configuration on the air bearing surface 220 side of the magnetic head slider 202.

In the magnetic recording-reproducing unit, when the arm 204 pivots at the time of recording or reproducing information, the magnetic head slider 202 moves to a predetermined recording region on the magnetic disk 201. Then, when power is applied to the thin film magnetic head 212 in a state where that faces the magnetic disk 201, recording processing or reproducing processing is performed on the magnetic disk 201 by the thin film magnetic head 212 based on the above-described operation principle.

[Configuration of Thin Film Magnetic Head]

FIGS. 3A and 3B, FIGS. 4A to 4C, and FIG. 5 each illustrate a structure example of the thin film magnetic head 212 that includes a perpendicular magnetic recording head mounted on the above-described magnetic recording-reproducing unit.

Figure 3A:
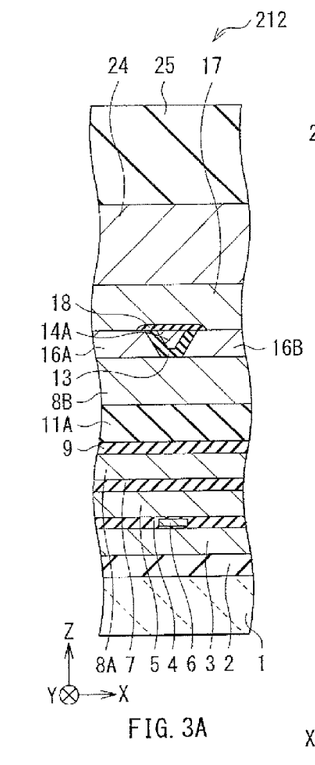
FIGS. 3A and 3B are each a sectional diagram illustrating a structure of a thin film magnetic head illustrated in FIG. 2.
Figure 3B:
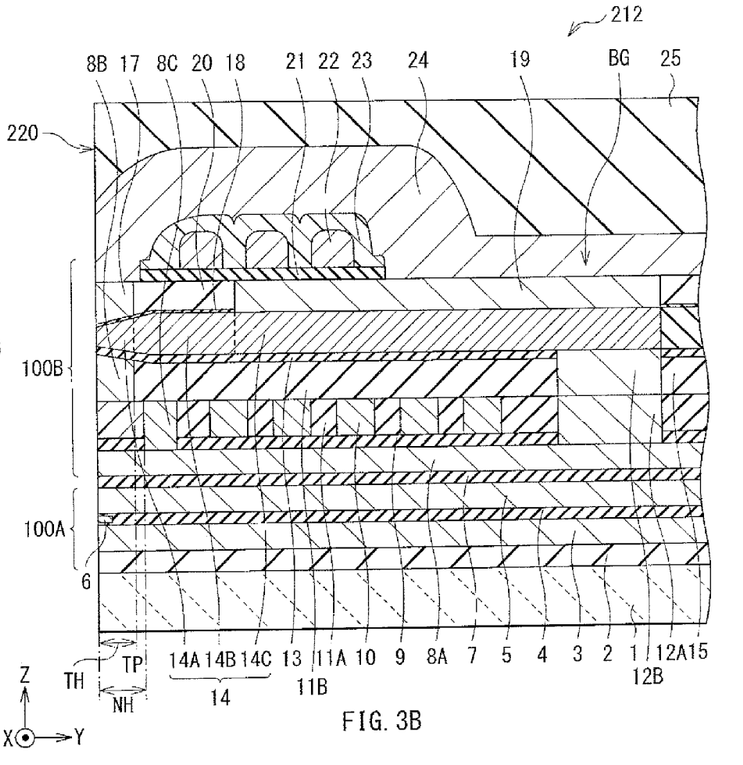
Figure 4A:
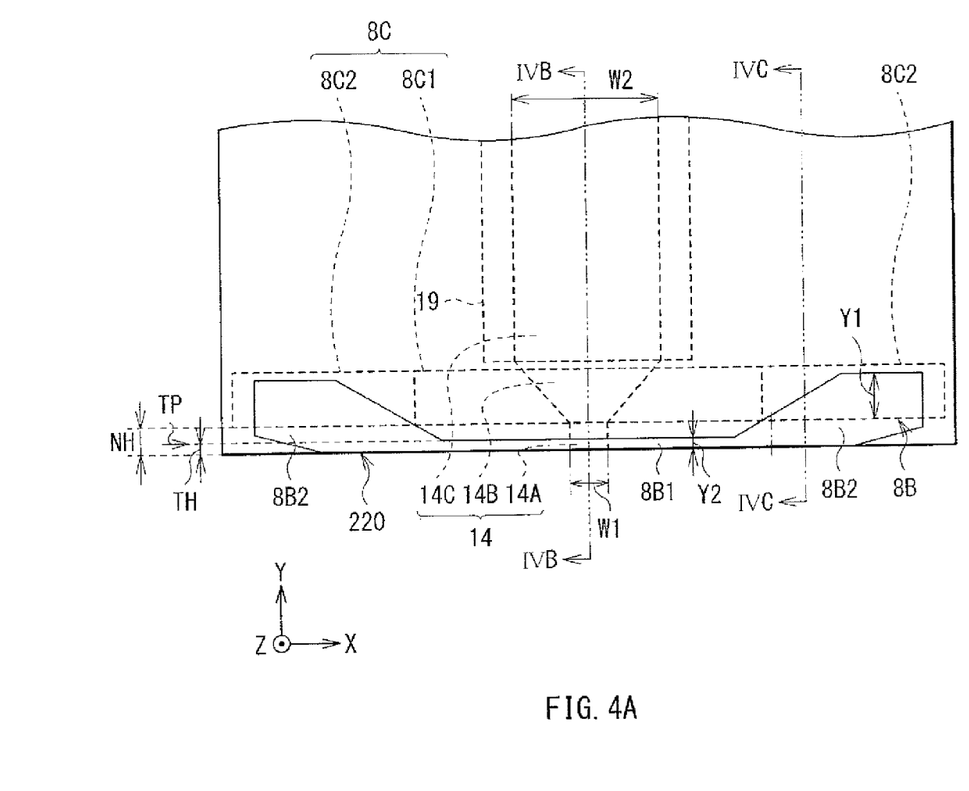
FIG. 4A is a plan view illustrating a structure of a main part of the thin film magnetic head illustrated in FIG. 2.
Figure 4B:
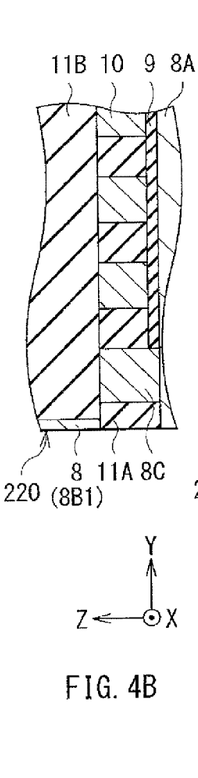
FIGS. 4B and 4C are each a sectional diagram illustrating the structure of the main part of the thin film magnetic head illustrated in FIG. 2.
Figure 4C:
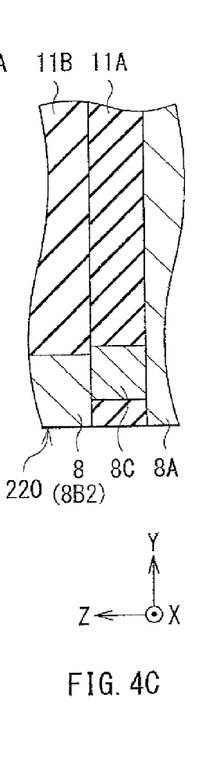

FIGS. 3A and 3B each illustrate a cross-sectional structure of the entire thin film magnetic head 212. In detail, FIG. 3A illustrates a cross section (an XZ cross section) parallel to the air bearing surface 220, and FIG. 3B illustrates a cross section (an YZ cross section) orthogonal to the air bearing surface 220. FIG. 4A illustrates a planar structure of a main part. FIGS. 4B and 4C illustrate a cross-sectional structure taken along a IVB-IVB cut line and a IVC-IVC cut line in FIG. 4A, respectively. In addition, FIG. 5 is a diagram for explaining a relationship between the thin film magnetic head 212 and the magnetic disk 201.

Figure 5:
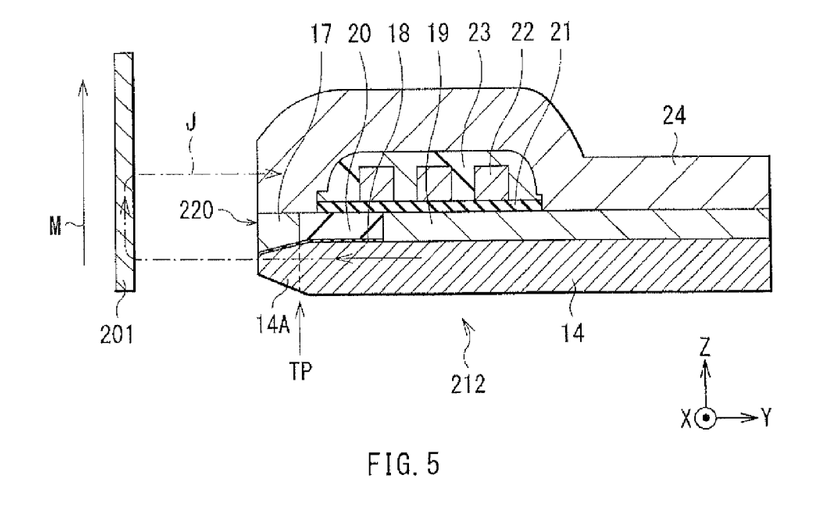
FIG. 5 is a sectional diagram for explaining relationship between the thin film magnetic head illustrated in FIG. 2 and a magnetic disk.

Note that an up-arrow M illustrated in FIG. 5 indicates a direction in which the magnetic disk 201 relatively moves with respect to the thin film magnetic head 212.

In the following description, dimensions in the X-axis direction, Y-axis direction, and the Z-axis direction are referred to as "width", "height", and "thickness", respectively, and a closer side and a farther side to/from the air bearing surface 220 in the Y-axis direction are referred to as "forward" and "backward", respectively. Moreover, frontward and rearward in the direction of the arrow M are referred to as "trailing side" and "leading side", respectively, and the X-axis direction and the Z-axis direction are referred to as "cross track direction" and "down track direction", respectively.

The thin film magnetic head 212 performs magnetic process on the magnetic disk 201, and may be, for example, a composite head capable of performing both the reproducing processing and the recording processing.

As illustrated in FIGS. 3A and 3B, for example, the thin film magnetic head 212 may be configured by stacking an insulating layer 2, a read head section 100A, a separation layer 7, a write head section 100B, and an overcoat 25 in this order on a substrate 1, and has the air bearing surface 220 as a side surface common to these layers and sections.

The insulating layer 2, the separation layer 7, and the overcoat 25 may be each formed of a non-magnetic insulating material such as aluminum oxide. Examples of the aluminum oxide include alumina ($Al_2O_3$).

The read head section 100A uses magneto-resistive effect (MR) to perform the reproducing processing. The read head section 100A may be configured by stacking, for example, a lower lead shield 3, a shield gap 4, and an upper lead shield 5 in this order. An MR element 6 as a read element is so embedded in the shield gap 4 as to allow one end surface of the MR element 6 to be exposed on the air bearing surface 220.

The lower lead shield 3 and the upper lead shield 5 each magnetically separate the MR element 6 from its surroundings, and extend backward from the air bearing surface 220. In addition, when the MR element 6 is a tunneling magneto-resistive effect element (TMR element) or a CPP (current perpendicular-to-Plane) type magneto-resistive effect element, the lower lead shield 3 and the upper lead shield 5 function as a lead that is a path supplying a current to the MR element 6. The lower lead shield 3 may be formed of, for example, a magnetic material such as nickel iron alloy (NiFe). For example, nickel iron alloy may be Permalloy (trade name), or others in which the content of nickel is 80 wt % and the content of iron is 20 wt %. The upper lead shield 5 may be formed of, for example, a magnetic material such as Permalloy. Incidentally, the lower lead shield 3 and the upper lead shield 5 may have a single-layer structure, or may have a multilayer structure in which, for example, a non-magnetic layer (formed of, for example, a non-magnetic conductive material such as ruthenium (Ru) or a non-magnetic insulating material such as alumina) is sandwiched between a pair of magnetic layers (formed of a magnetic material such as Permalloy).

The shield gap 4 electrically separates the MR element 6 from its surroundings, and may be formed of, for example, a non-magnetic insulating material such as alumina. The MR element 6 uses giant magneto-resistive effect (GMR), tunneling magneto-resistive effect (TMR), or the like to perform the reproducing processing.

The write head section 100B is a perpendicular magnetic write head performing recording processing of a perpendicular magnetic recording system. The write head section 100B may be configured by stacking, on the separation layer 7, for example, a magnetic layer 8A, an insulating layer 9, a thin film coil 10 and a recess shield 8C that are embedded in an insulating layer 11A, a leading shield 8B having an end surface exposed on the air bearing surface 220 and an insulating layer 11B located on a backward thereof, an insulating layer 13, a main magnetic pole 14 and a pair of side shields 16A and 16B, a trailing gap 18, a pedestal yoke 17, a top yoke 19, an insulating layer 20, a thin film coil 22 embedded in insulating layers 21 and 23, and a write shield 24 in this order. The pedestal yoke 17 and the write shield 24 integrally configure a trailing shield. The magnetic layer 8A and the main magnetic pole 14 are magnetically connected to each other by a coupling part 12A provided on a backward of the thin film coil 10 and a coupling part 12B provided on the coupling part 12A on a backward of the insulating layer 11B.

The magnetic layer 8A functions as a return path (or a return shield) on the leading side, and may be formed of, for example, a magnetic material such as NiFe and CoNiFe. The magnetic layer 8A is connected to the main magnetic pole 14 through other magnetic layers (the coupling part 12A and the coupling part 12B) and a part of recording magnetic field emitted from the main magnetic pole 14 is dispersed to the leading side so that WATE (wide adjacent track erase) effective magnetic field is reduced. The WATE effective magnetic field means effective magnetic field affecting adjacent tracks within a wide range (for example, two to ten tracks adjacent to a track to be written), as described above.

The thin film coil 10 generates leakage-suppression magnetic flux mainly to suppress unintentional reaching (leakage) of recording-use magnetic flux, which is generated by the thin film coil 22, to the read head section 100A. The thin film coil 10 may be formed of, for example, a high conductive material such as copper (Cu), and has a structure (a spiral structure) winding around a back gap BG.

The insulating layers 11A, 11B, 12, and 13 each electrically separate the thin film coil 10 from its surroundings. The insulating layer 11 may be formed of, for example, a non-magnetic insulating material such as photoresist flowing at heating, spin on glass (SOG), and alumina.

The recess shield 8C is provided at a position recessed from the air bearing surface 220 in a height direction (in the Y-axis direction). In other words, the insulating layer 11A is provided between the recess shield 8C and the air bearing surface 220. In addition, in the thickness direction (in the Z-axis direction), the insulating layer 11B and the insulating layer 13 are provided between the recess shield 8C and the main magnetic pole 14.

The main magnetic pole 14 takes therein magnetic flux generated by the thin film coil 22, and emits the magnetic flux from the air bearing surface 220 to generate recording magnetic field. The main magnetic pole 14 extends backward from the air bearing surface 220, and may be formed of, for example, a magnetic material with high saturation flux density such as iron-based alloy. Examples of the iron-based alloy may include iron cobalt alloy (FeCo) and iron cobalt nickel alloy (FeCoNi).

As illustrated in FIG. 4A, for example, the main magnetic pole 14 may have an integrated structure in which a front end section 14A having a uniform width W1 (a first width) defining a write track width, a mid-section 14B having a width that gradually increases from the width W1 up to a width W2 (a second width; W2>W1) larger than the width W1, and a rear end section 14C having the uniform width W2 are connected in this order backward from the air bearing surface 220.

The rear end section 14C may occupy a region overlapped with a part of the top yoke 19, for example. A position where the width of the main magnetic pole 14 starts to increase from the front end section 14A to the mid-section 14B, namely, a position where the width of the main magnetic pole 14 starts to increase from the width W1 defining the write track width is a neck height NH that is one of important factors determining recording performance of the thin film magnetic head.

The front end section 14A is a section substantially emitting recording-use magnetic flux, which is generated by the thin film coil 22, toward the magnetic disk 201, and is so extended in the Y-axis direction as to have the uniform width W1 over the entire section.

The mid-section 14B is a section supplying magnetic flux taken in the top yoke 19 to the front end section 14A. The width of the mid-section 14B gradually increases from the width W1 to the width W2, namely, the mid-section 14B has the width W1 at a part connected with the front end section 14A, and has the width W2 at a part connected with the rear end section 14C. The expansion angle in the mid-section 14B, that is, an angle φ between an extending direction (the Y-axis direction) of the front end section 14A and a side end 14BE of the mid-section 14B is equal to or larger than 30 degrees, and may be preferably within a range of about 40 degrees to about 50 degrees.

The rear end section 14C is a section supplying magnetic flux taken in the top yoke 19 to the front end section 14A, similarly to the mid-section 14B. The rear end section 14C is so extended in the Y-axis direction as to have the uniform width W2 over the entire section as described above.

The thickness of the main magnetic pole 14 may be uniform over all or may be partially varied. Here, for example, the thickness of the front end section 14A may gradually decrease with decrease in distance from the air bearing surface 220, as compared with the uniform thickness of the mid-section 14B and the rear end section 14C. Here, both of the surfaces on the trailing side and on the leading side of the front end section 14A are inclined.

The main magnetic pole 14 is surrounded by the insulating layer 13 and the trailing gap 18 in the vicinity of the air bearing surface 220, and is mutually separated and magnetically shielded from the leading shield 8B, the side shields 16A and 16B, and the pedestal yoke 17. However, the main magnetic pole 14 is connected to the leading shield 8B through the coupling parts 12A and 12B at the backward of the thin film coil 10 as described above.

The insulating layer 13 also functions as a side gap, and magnetically separates the main magnetic pole 14 from the pair of side shields 16A and 16B in the width direction (in the write track width direction=in the X-axis direction). A part functioning as the side gap of the insulating layer 13 is provided between the main magnetic pole 14 and the pair of side shields 16A and 16B, and is adjacent to both sides in the width direction of the main magnetic pole 14 (hereinafter, simply referred to as "both sides").

The trailing gap 18 magnetically separates the main magnetic pole 14 from the pedestal yoke 17 in the thickness direction (a direction intersecting with the write track width direction=the Y-axis direction), and is also called a write gap. The trailing gap 18 is provided between the main magnetic pole 14 and the pedestal yoke 17. Note that the trailing gap 18 may be formed of, for example, a non-magnetic material such as alumina.

Each of the leading shield 8B, the recess shield 8C, the pedestal yoke 17, and the side shields 16A and 16B may be formed of, for example, a magnetic material similar to that of the main magnetic pole 14, and mainly takes in magnetic flux in the vicinity of the air bearing surface 220 to prevent that magnetic flux from spreading. As a result, the gradient of the recording magnetic field is increased, the write track width is narrowed, and the magnetic field component in an oblique direction is accordingly generated in the recording magnetic field. The leading shield 8B, the pedestal yoke 17, and the side shields 16A and 16B extend backward from the air bearing surface 220 in a middle region in the width direction, and may be terminated at the neck height NH, for example. Accordingly, the pedestal yoke 17 and the side shields 16A and 16B are adjacent to the insulating layer 20 on the backward thereof, and play a role to define the front-most end position (a throat height zero position TP) of the insulating layer 20. For example, as illustrated in FIGS. 4A to 4C, the recess shield 8C may be positioned behind the neck height NH. However, the position of the front end of the recess shield 8C may be coincident with the position of the neck height NH, or may be positioned on a more front side than the neck height NH.

The recess shield 8C may be, for example, a rectangular member extending in the width direction as illustrated in FIG. 4A. As illustrated in FIG. 4A and FIG. 4B, a mid-part 8C1 in the width direction of the recess shield 8C is distanced from the leading shield 8B, and is located on the backward of the leading shield 8B. On the other hand, as illustrated in FIG. 4A and FIG. 4C, end parts 8C2 in the width direction of the recess shield 8C are each overlapped with the leading shield 8B, and an upper surface of each of the end parts 8C2 is in contact with the lower surface of the leading shield 8B.

The leading shield 8B has an end surface exposed on the air bearing surface 220, as well as has a mid-part 8B1 extending in the width direction and a pair of wing parts 8B2 connected to respective ends thereof and each expanding in a direction (+Y direction) away from the air bearing surface 220. The mid-part 8B1 is distanced from the recess shield 8C, whereas the pair of wing parts 8B2 is partially in contact with a part of the respective ends 8C2 of the recess shield 8C. The mid-part 8B1 is a part partially overlapped with the front end section 14A of the main magnetic pole 14 in the thickness direction.

Moreover, a dimension Y1 in the height direction of the part where the pair of wing parts 8B2 of the leading shield 8B and a part of the respective ends 8C2 of the recess shield 8C are overlapped with each other may be desirably larger than a dimension Y2 in the height direction of the mid-part 8B1 in the width direction of the leading shield 8B. This is because magnetic choking is allowed to be avoided, and thus degradation of magnetic shield function on the leading side is allowed to be prevented.

The pair of wing parts 8B2 of the leading shield 8B may be preferably formed so as not to overlap with the mid-section 14B and the rear end section 14C of the main magnetic pole 14, for example. This is because the magnetic flux that travels from the rear end section 14C to the front end section 14A via the mid-section 14B is avoided from directly leaking into the leading shield 8B.

The insulating layer 20 is provided on a backward of the pedestal yoke 17. The insulating layer 20 defines a throat height TH that is one of the important factors determining recording performance of the thin film magnetic head, and is surrounded by the top yoke 19, the pedestal yoke 17, and the side shields 16A and 16B. A front-most end position of the insulating layer 20 is the throat height zero position TP as described above, and a distance between the throat height zero position TP and the air bearing surface 220 is defined as the throat height TH. The insulating layer 20 may be formed of, for example, a non-magnetic material such as alumina.

Incidentally, in FIG. 3B and FIG. 4A, for example, the case where the throat height zero position TP is positioned on a more front side (on the ABS side) than the neck height NH is illustrated. However, the throat height zero position TP may be coincident with the neck height NH, or the throat height zero position TP may be positioned on a more rear side than the neck height NH.

The top yoke 19 functions as an auxiliary magnetic-flux taking part to supply magnetic flux to the main magnetic pole 14, and for example, may be formed of a magnetic material similar to or different from that of the main magnetic pole 14. The top yoke 19 extends backward from a position recessed from the air bearing surface 220 on the trailing side of the main magnetic pole 14, and a lower surface thereof is connected with the main magnetic pole 14. The top yoke 19 may have a rectangular planar shape with a width larger than the width W2, for example, as illustrated in FIG. 4A. However, the width of the top yoke 19 may be smaller than the width W2. The thin film coil 22 generates a recording-use magnetic flux, and in the thin film coil 22, for example, a current may flow in a direction opposite to that of the current flowing through the thin film coil 10. Note that the detailed structure of the thin film coil 22 may be similar to that of the thin film coil 10, for example. In addition, instead of the thin film coils 10 and 22 having a spiral structure winding in the stacked-surface as described above, a helical coil that has a structure winding around the main magnetic pole 14 and the top yoke 19 while proceeding in the Y-axis direction, may be employed.

The insulating layers 21 and 23 each electrically separate the thin film coil 22 from its surroundings, and are connected with the insulating layer 20. The insulating layer 21 may be formed of, for example, a non-magnetic insulating material such as alumina, and the insulating layer 23 may be formed of, for example, a non-magnetic insulating material such as photoresist and spin on glass (SOG). The front-most end of each of the insulating layers 21 and 23 may be recessed from the front-most end of the insulating layer 20, for example.

The write shield 24 mainly takes in magnetic flux returning from the magnetic disk 201 to the write head section 100B, and circulates the magnetic flux therebetween. The circulation function for this magnetic flux is provided by not only the write shield 24 but also the side shields 16A and 16B and the pedestal yoke 17, in some cases. The write shield 24 is positioned on the trailing side of the side shields 16A and 16B, the pedestal yoke 17, and the top yoke 19, and extends backward from the air bearing surface 220 as a starting point. The write shield 24 is connected with the pedestal yoke 17 and an additional magnetic layer 31 on the front side thereof, and is connected with the top yoke 19 at the back gap BG on the rear side thereof. In addition, the write shield 24 may be formed of, for example, a magnetic material similar to that of the main magnetic pole 14, and has a rectangular planar shape with a width larger than the width W3. Note that the write shield 24 may be formed of a magnetic material different from that of the main magnetic pole 14.

[Method of Manufacturing Thin Film Magnetic Head]

Next, an example of a method of manufacturing the thin film magnetic head 212 is described with reference to FIG. 6 to FIG. 18, in addition to FIGS. 3A and 3B. FIG. 6 to FIG. 18 are sectional diagrams for explaining steps of forming a main part of the thin film magnetic head 212, and correspond to a part of FIG. 3B. Note that, in FIG. 6 to FIG. 12, illustration of the components from the substrate 1 up to the separation layer 7 is omitted. In addition, in FIG. 13 to FIG. 18, illustration of the components located lower than the insulating layer 13 is omitted. The details of materials, dimensions, shapes, and the like of a series of components which have been already described will be appropriately omitted in the following description about the method of manufacturing the thin film magnetic head 212.

The thin film magnetic head 212 is mainly manufactured by sequentially forming and stacking a series of components using an existing thin film process. The existing thin film process may be, for example, film formation techniques such as electrolytic plating and sputtering, patterning techniques such as photolithography, etching techniques such as dry etching and wet etching, and polishing techniques such as chemical mechanical polishing (CMP).

First, as illustrated in FIGS. 3A and 3B, the insulating layer 2 is first formed on the substrate 1. Subsequently, the lower lead shield 3, the shield gap 4 embedded with the MR element 6, and the upper lead shield 5 are stacked and formed in this order on the insulating layer 2 to form the read head section 100A. Then, the separation layer 7 is formed on the read head section 100A.

Figure 6:
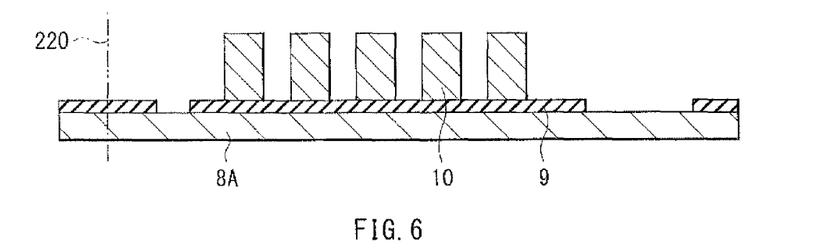
FIG. 6 is a sectional diagram for explaining a step of forming the main part of the thin-film magnetic head.

Subsequently, the magnetic layer 8A is formed on the separation layer 7, and the insulating layer 9 and the thin film coil 10 are then formed in order at respective predetermined positions on the magnetic layer 8A (FIG. 6).

Figure 7:
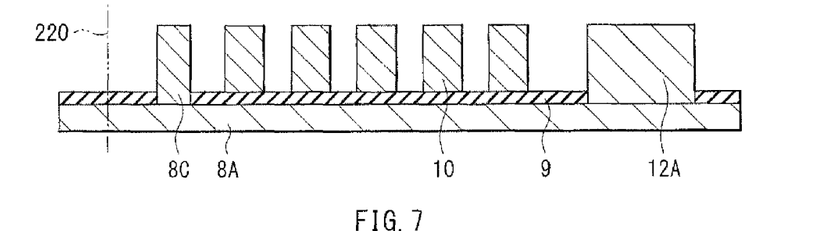
FIG. 7 is a sectional diagram for explaining a step following the step of FIG. 6.

Next, the recess shield 8C is formed on a forward of the thin film coil 10, and the coupling part 12A is formed on a backward of the thin film coil 10 (FIG. 7).

Figure 8:
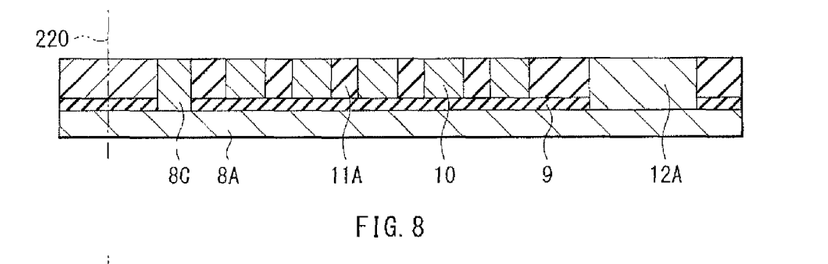
FIG. 8 is a sectional diagram for explaining a step following the step of FIG. 7.

After that, an insulating film is so formed as to cover the entire surface, then flattering treatment is entirely performed to adjust the height of the recess shield 8C, the thin film coil 10, and the coupling part 12A, and the upper surfaces of the respective parts are exposed. As a result, surroundings of the recess shield 8C, the thin film coil 10, and the coupling part 12A are in a state of being filled with the insulating layer 11A (FIG. 8).

Figure 9:
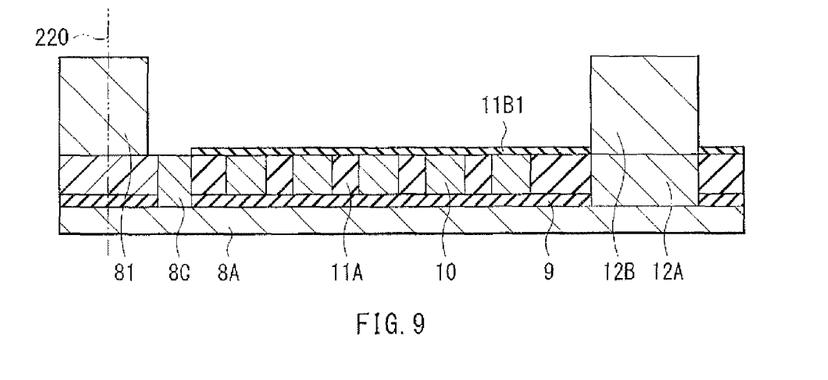
FIG. 9 is a sectional diagram for explaining a step following the step of FIG. 8.

Subsequently, to electrically insulate the thin film coil 10 from its surroundings, an insulating layer 11B1 that covers the thin film coil 10 and the insulating layer 11A in the periphery thereof is formed, and then a first layer 81 is formed on the insulating layer 11A positioned on a forward of the recess shield 8C and the coupling part 12B is provided on the coupling part 12A (FIG. 9). The first layer 81 is formed of a material forming the leading shield 8B.

Figure 10:
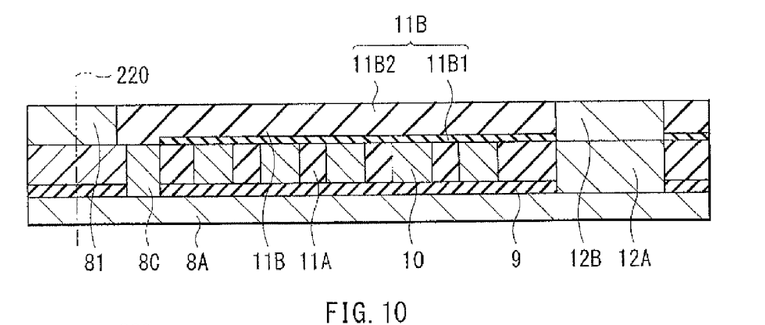
FIG. 10 is a sectional diagram for explaining a step following the step of FIG. 9.

After that, an insulating film 11B2 is so formed as to cover the entire surface, and then the flattering treatment is entirely performed to adjust the height of the first layer 81 and the coupling part 12B, and the upper surfaces of these parts are exposed. As a result, the forward of the first layer 81 and the surroundings of the coupling part 12B are in a state of being filled with the insulating layer 11B (FIG. 10).

Figure 11:
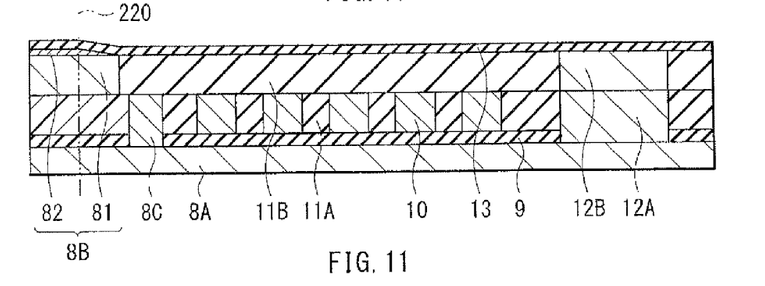
FIG. 11 is a sectional diagram for explaining a step following the step of FIG. 10.

Subsequently, as illustrated in FIG. 11, a second layer 82 is formed on the first layer 81. As a result, the leading shield 8B configured of the first layer 81 and the second layer 82 is formed. The second layer 82 has, at the backward part thereof, an inclined surface that is so inclined as to be away from the magnetic layer 8A with decrease in distance from the air bearing surface 220. The inclined surface may be formed by, for example, ion beam etching. After the formation of the second layer 82, the side shields 16A and 16B are formed in a predetermined region on the leading shield 8B. After that, the insulating layer 13 is collectively formed so as to cover the predetermined region on the leading shield 8B and the inclined surfaces of the respective side shields 16A and 16B.

Figure 12:
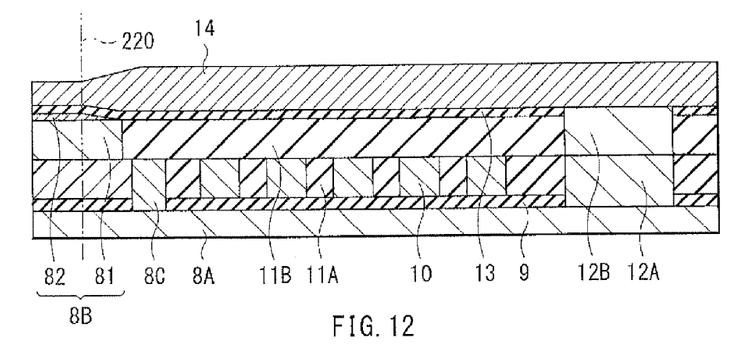
FIG. 12 is a sectional diagram for explaining a step following the step of FIG. 11.

Subsequently, after the part covering the coupling part 12B of the insulating layer 13 is selectively removed, the main magnetic pole 14 is so formed as to cover the insulating layer 13 and the coupling part 12B. Further, after an insulating layer (not illustrated) is so formed as to fill the surroundings of the side shields 16A and 16B and the main magnetic pole 14, flattering of the side shields 16A and 16B and the main magnetic pole 14 is performed. After that, an inclined surface is formed on the front part of the main magnetic pole 14 by selective etching (FIG. 12).

Figure 13:
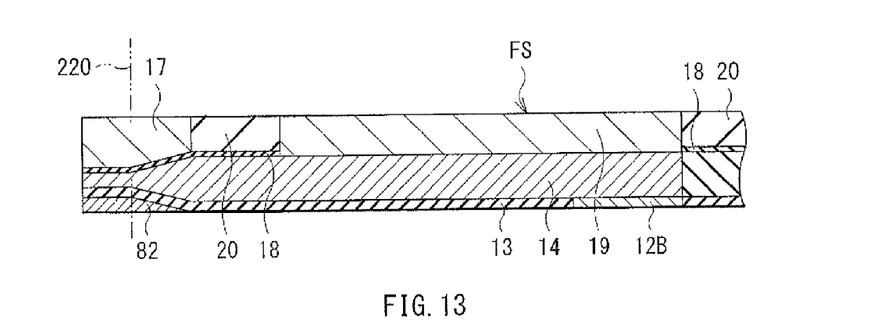
FIG. 13 is a sectional diagram for explaining a step following the step of FIG. 12.

Next, after the trailing gap 18 is formed on the main magnetic pole 14, the pedestal yoke 17 is formed on the front part thereof. Further, a part covering the rear end section 14C of the main magnetic pole 14 is selectively removed, and the top yoke 19 is formed in a region where the main magnetic pole is removed. Moreover, the insulating layer 20 is so formed as to fill the space between the pedestal yoke 17 and the top yoke 19 and surroundings of the top yoke 19, and the pedestal yoke 17, the top yoke 19, and the insulating layer 20 are flattened by the CMP method or the like to obtain a flattering surface FS (FIG. 13).

Figure 14:
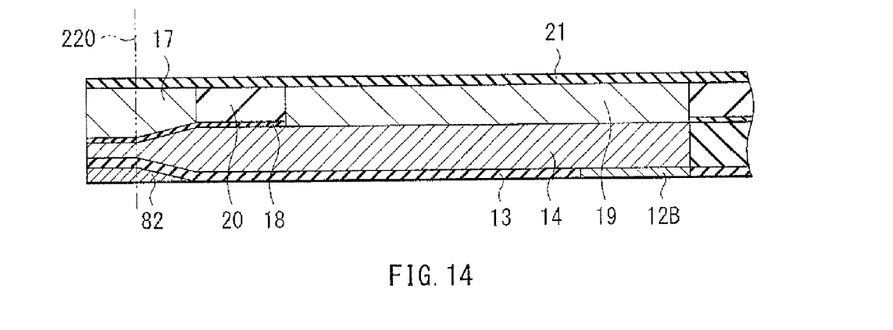
FIG. 14 is a sectional diagram for explaining a step following the step of FIG. 13.
Figure 15:
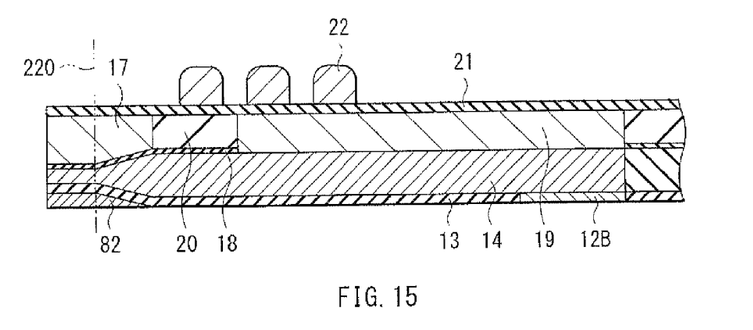
FIG. 15 is a sectional diagram for explaining a step following the step of FIG. 14.

Then, the insulating layer 21 is so formed as to cover the entire flattering surface FS (FIG. 14). Further, a resist mask (not illustrated) having a predetermined pattern shape is formed on the insulating layer 21 by photolithography or the like, and then the thin film coil 22 is formed by plating or the like using the resist mask (FIG. 15).

Figure 16:
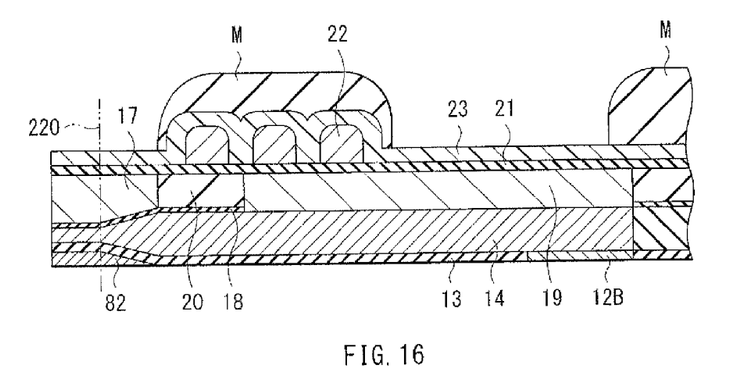
FIG. 16 is a sectional diagram for explaining a step following the step of FIG. 15.

Subsequently, after the insulating layer 23 is so formed as to cover the entire surface, a mask M is selectively formed so as to cover a partial region on the insulating layer 23 (FIG. 16).

Figure 17:
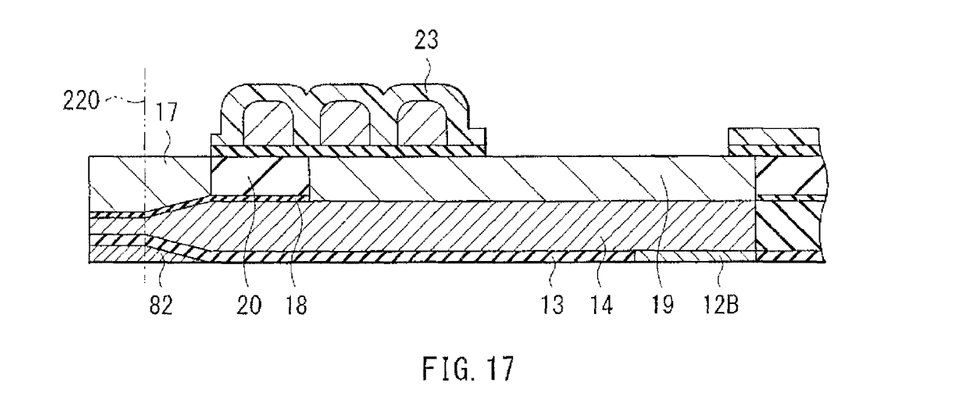
FIG. 17 is a sectional diagram for explaining a step following the step of FIG. 16.

After that, exposed parts not covered with the mask M of the insulating layers 21 and 23 are all removed in the thickness direction by, for example, dry etching treatment such as reactive ion etching (RIE) (FIG. 17).

In the dry etching treatment, a condition of selectively removing a non-metal such as alumina rather than a metal is employed. Employing such a condition allows parts of the pedestal yoke 17 and the top yoke 19 to be exposed.

Figure 18:
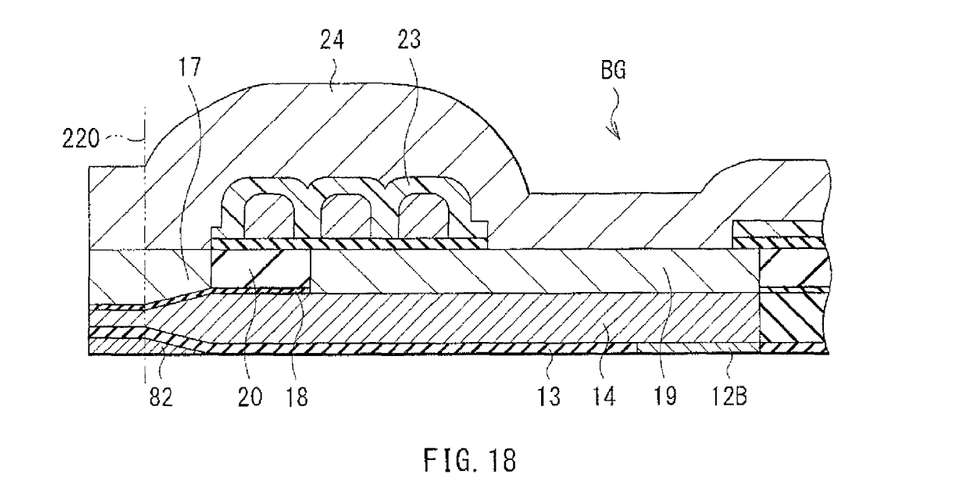
FIG. 18 is a sectional diagram for explaining a step following the step of FIG. 17.

After that, the write shield 24 that magnetically connects the pedestal yoke 17 and the top yoke 19 is formed by depositing a predetermined magnetic material so as to cover the entire surface. As a result, the write head section 100B is formed (FIG. 18).

Finally, the overcoat 25 is formed on the write head section 100B, and then the air bearing surface 220 is formed by polishing together the side surfaces of the staked body from the substrate 1 up to the overcoat 25 using the CMP or the like. Consequently, the thin film magnetic head is completed.

[Operation of Thin Film Magnetic Head]

The thin film magnetic head 212 operates as follows.

In recording data in the magnetic disk 201, first, the spindle motor 205 is driven to rotate the magnetic disk 201. The magnetic head slider 202 is accordingly floated above the surface of the magnetic disk 201. On the other hand, a not-illustrated external circuit applies a current to the thin film coil 22 of the write head section 100B to generate magnetic flux J for recording (see FIG. 5). The magnetic flux J is taken in the main magnetic pole 14 and the top yoke 19, and then flows through the inside of the main magnetic pole 14 toward the front end section 14A. At this time, since being focused by the neck height NH, the magnetic flux J eventually converges near a trailing edge. When the magnetic flux J is emitted to the outside and recording magnetic field is accordingly generated, a hard magnetic recording layer (not illustrated) in a region supplied with the recording magnetic field in the magnetic disk 201 is magnetized. As a result, data is magnetically recorded in the magnetic disk 201.

In the thin film magnetic head 212, the current flows through the thin film coils 10 and 22 in directions opposite to each other, and therefore, the magnetic flux is generated therein in directions opposite to each other. In detail, in the thin film coil 22, the magnetic flux for recording is generated toward the leading side, whereas in the thin film coil 10, the magnetic flux for suppressing leakage is generated toward the trailing side. Accordingly, the magnetic flux for recording becomes difficult to leak to the read head section 100A, which suppresses lowering of the detection accuracy of the MR element 6. In addition, the information recorded in the magnetic disk 201 is prevented from being unintentionally deleted due to the unnecessary magnetic field that is generated when the magnetic flux for recording is taken in the lower lead shield 3 and the upper lead shield 5.

In addition, when the magnetic flux J is emitted from the front end section 14A, a part (spread component) of the magnetic flux J is taken in the pedestal yoke 17, the side shields 16A and 16B, and the leading shield 8B, and thus spreading of the recording magnetic field is suppressed and the gradient of the recording magnetic field is increased. The magnetic flux J taken in the pedestal yoke 17 and the side shields 16A and 16B is resupplied to the main magnetic pole 14 through the write shield 24.

Note that the magnetic flux J emitted from the main magnetic pole 14 toward the magnetic disk 201 magnetizes the hard magnetic recording layer in the magnetic disk 201 and then returns to the write shield 24, and is resupplied to the main magnetic pole 14. Therefore, the magnetic flux J circulates between the write head section 100B and the magnetic disk 201, thereby building a magnetic circuit.

On the other hand, at the time of reproduction, when a sense current flows through the MR element 6 of the read head section 100A, the resistance value of the MR element 6 varies in response to signal magnetic field for reproduction in the magnetic disk 201. The resistance variation is detected as voltage variation so that information recorded in the magnetic disk 201 is magnetically reproduced.

[Function and Effects of Thin Film Magnetic Head and Magnetic Recording-Reproducing Unit]

In the thin film magnetic head 212 and the magnetic recording-reproducing unit of the present embodiment, the mid-part 8C1 located at a position corresponding to the front end section 14A, of the recess shield 8C is arranged at a backward of the leading shield 8B so as to be distanced from the leading shield 8B. On the other hand, the end parts 8C2 of the recess shield 8C are so arranged as to be in contact with the leading shield 8B. With such a configuration, the leakage of the magnetic flux from the main magnetic pole 14 to the leading shield 8B and the recess shield 8C is allowed to be suppressed without lengthening the length of the magnetic path from the leading shield 8B to the magnetic layer 8A via the recess shield 8C.

The mid-part 8C1 is distanced from the leading shield 8B, which allows suppression of taking-in of the magnetic flux J from the leading edge in the front end section 14A of the main magnetic pole 14. Therefore, taking-in function of the magnetic flux J by the side shields 16A and 16B and the pedestal yoke 17 is relatively improved.

In addition, the recess shield 8C is provided at a position recessed from the air bearing surface 220, which allows suppression of spreading of the magnetic flux J returned from the magnetic recording medium 201 and allows suppression of occurrence probability of generation source (hot spot) of WATE.

For these reasons, it is possible to deal with higher density recording while suppressing incorrect writing to adjacent tracks.

Figure 20:
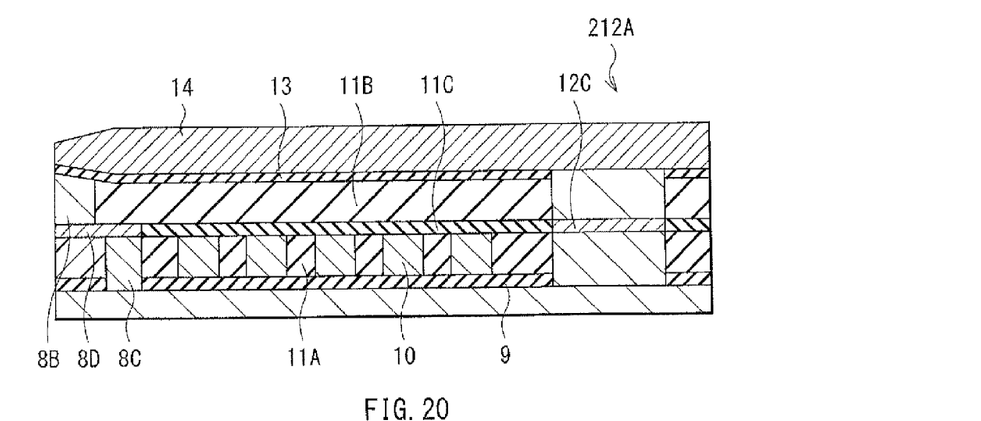
FIG. 20 is a sectional diagram of a main part illustrating a structure of a thin film magnetic head as a comparative example.

In contrast, in a thin film magnetic head 212A as a comparative example illustrated in FIG. 20, for example, the recess shield 8C is connected to the leading shield 8B at the middle region in the width direction of the recess shield 8C by an additional magnetic layer 8D. In the thin film magnetic head 212A of FIG. 20, however, the length of the magnetic path is increased by existence of the additional magnetic layer 8D, and the recording performance may be deteriorated due to degradation of the magnetization efficiency on the leading side. Further, the insulating layer 11C and the coupling part 12C are formed in addition to the magnetic layer 8D, which causes complexity in structure, and thus additional manufacturing step is necessary.

Figure 21:
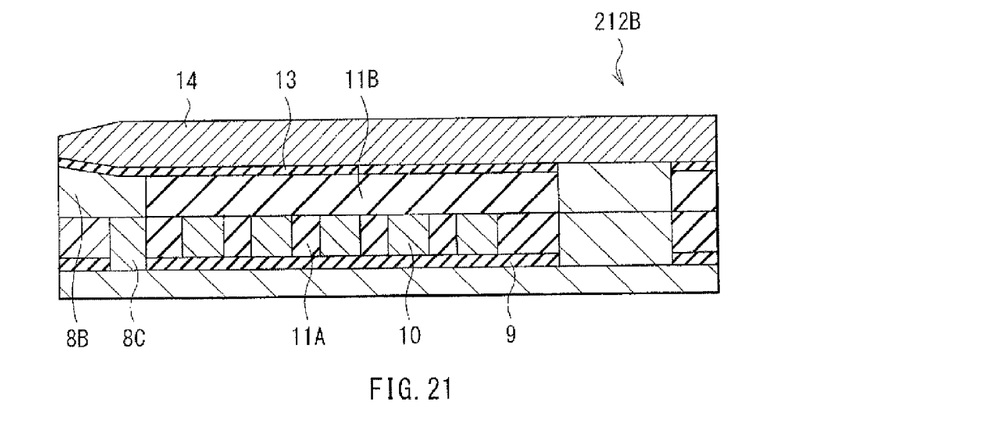
FIG. 21 is a sectional diagram of a main part illustrating a structure of a thin film magnetic head as another comparative example.

Therefore, a thin film magnetic head 212B in which the recess shield 8C is connected to the leading shield 8B at the middle region in the width direction of the recess shield 8C without providing the additional magnetic layer 8D is conceivable as other comparative example illustrated in FIG. 21, for example. The thin film magnetic head 212B of FIG. 21 is configured by expanding the leading shield 8B backward, and bring the lower surface of the leading shield 8B into contact with the upper surface of the recess shield 8C. In the thin film magnetic head 212B of FIG. 21, however, since a region where the leading shield 8B faces the main magnetic pole 14 is increased, it is concerned that the magnetic flux is leaked from the main magnetic pole 14 into the leading shield 8B.

Moreover, when the recess shield 8C is exposed on the air bearing surface 220, it is concerned that the recess shield 8C is swollen by heat generation by the thin film coil 10 or the like, and projection occurs on the air bearing surface 220.

On the other hand, according to the thin film magnetic head 212 and the magnetic recording-reproducing unit of the present embodiment, the above-described disadvantage is avoided and the magnetic recording efficiency is further improved while simplification of the configuration is achieved.

[Modifications]

Hereinbefore, although the invention has been described with reference to the embodiment, the invention is not limited to the above-described embodiment, and various modifications may be made. For example, although the perpendicular magnetic write head of the invention is applied to the composite head, it is not necessarily limited thereto, and the perpendicular magnetic write head may be applied to a write-only head without a read head section.

Moreover, the structure (shape) of the main part of the thin film magnetic head is allowed to be variously modified. Some modifications of the thin film magnetic head of the above-described embodiment are described below.

(First to Third Modifications)

Figure 19A:
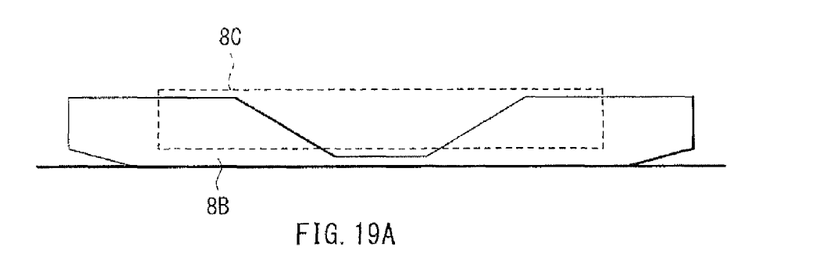
FIG. 19A is a plan view illustrating a first modification relating to the structure of the thin film magnetic head.

In the above-described embodiment, as illustrated in FIG. 4A, the width of the recess shield 8C is larger than the width of the leading shield 8B. However, for example, as with a thin film magnetic head as a first modification illustrated in FIG. 19A, the width of the leading shield 8B may be larger than the width of the recess shield 8C.

Figure 19B:
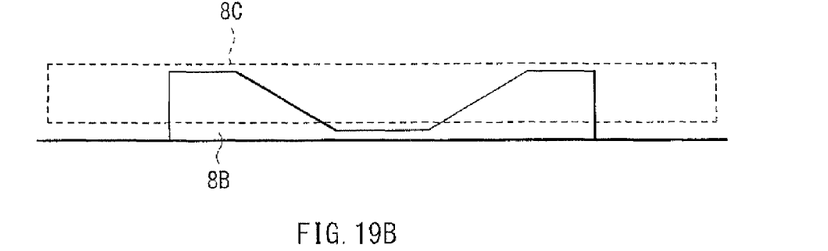
FIG. 19B is a plane view illustrating a second modification relating to the structure of the thin film magnetic head.

In addition, the planar shape of the leading shield 8B is not limited to that illustrated in FIG. 4A. For example, as with a thin film magnetic head as a second modification illustrated in FIG. 19B, the entire front end surface of the leading shield 8B may be parallel to the air bearing surface 220.

Figure 19C:
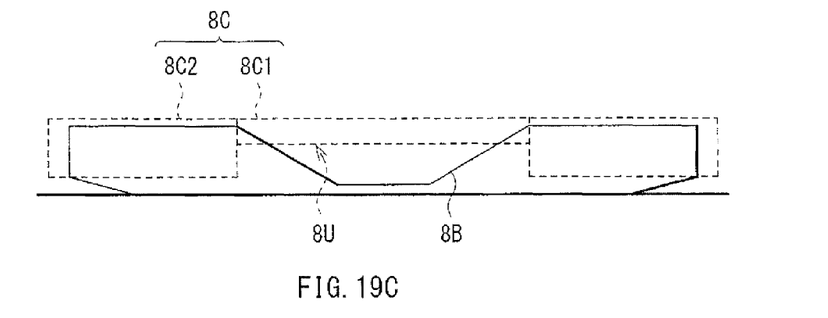
FIG. 19C is a plan view illustrating a third modification relating to the structure of the thin film magnetic head.

Moreover, the planar shape of the recess shield 8C is not limited to that illustrated in FIG. 4A. For example, as with a thin film magnetic head as a third modification illustrated in FIG. 19C, a concave section 8U is provided in the mid-part 8C1 of the recess shield 8C and the mid-part 8C1 may be further distanced from the air bearing surface 220.

The correspondence relationships between the reference numerals and the components of the present embodiment are collectively described as follows.

1 . . . substrate, 2, 9, 11A, 11B, 13, 20, 21, 23 . . . insulating layer, 3 . . . lower lead shield, 4 . . . shield gap, 5 . . . upper lead shield, 6 . . . magneto-resistive effect (MR) element, 7 . . . separation layer, 8A . . . magnetic layer, 8B . . . leading shield, 8C . . . recess shield, 10, 22 . . . thin film coil, 12A, 12B . . . coupling part, 14 . . . main magnetic pole, 14A . . . front end section, 14B . . . mid-section, 14C . . . main end section, 16 . . . side shield, 17 . . . pedestal yoke, 18 . . . trailing gap, 19 . . . top yoke, 24 . . . write shield, 25 . . . overcoat, 220 . . . air bearing surface, 100A . . . read head section, 100B . . . write head section, 200 . . . housing, 201 . . . magnetic disk, 202 . . . magnetic head slider, 203 . . . suspension, 204 . . . arm, 205 . . . spindle motor, 206 . . . drive section, 207 . . . fixed shaft, 208 . . . bearing, 211 . . . base material, 212 . . . thin film magnetic head, 220 . . . air bearing surface.

What is claimed is:

1. A perpendicular magnetic recording head comprising:
   a magnetic pole including an end surface exposed on an air bearing surface, and extending in a height direction perpendicular to the air bearing surface;
   a leading shield including an end surface exposed on the air bearing surface;
   a leading gap provided between the magnetic pole and the leading shield; and
   a recess shield including a mid-part and other parts, and provided at a position on a side opposite to the magnetic pole with the leading shield in between, the mid-part being distanced from the leading shield in a track width direction, the other parts being in contact with the leading shield, and the position being recessed from the air bearing surface,
   wherein the other parts of the recess shield are a pair of end parts opposed to each other with the mid-part in between in the track width direction.

2. The perpendicular magnetic recording head according claim 1, further comprising:
   a trailing shield provided to be opposed to the leading shield with the magnetic pole in between along the air bearing surface; and
   a trailing gap layer provided between the magnetic pole and the trailing shield.

3. The perpendicular magnetic recording head according to claim 1, further comprising:
   a pair of side shields opposed to each other with the magnetic pole in between in the track width direction; and
   a pair of side gap layers provided between the magnetic pole and the pair of side shields.

4. A perpendicular magnetic recording head comprising:
   a magnetic pole including an end surface exposed on an air bearing surface, and extending in a height direction perpendicular to the air bearing surface;
   a leading shield including an end surface exposed on the air bearing surface;
   a leading gap provided between the magnetic pole and the leading shield; and
   a recess shield including a mid-part and other parts, and provided at a position on a side opposite to the magnetic pole with the leading shield in between, the mid-part being distanced from the leading shield in a track width direction, the other parts being in contact with the leading shield, and the position being recessed from the air bearing surface,
   wherein a dimension in the height direction of an overlapping part in which the leading shield and the recess shield are overlapped with each other is larger than a dimension in the height direction of a mid-part of the leading shield, the mid-point of the leading shield extending in the width direction from a part of the leading shield that corresponds to the overlapping part.

5. The perpendicular magnetic recording head according to claim 4, further comprising:
   a trailing shield provided to be opposed to the leading shield with the magnetic pole in between along the air bearing surface; and
   a trailing gap layer provided between the magnetic pole and the trailing shield.

6. The perpendicular magnetic recording head according to claim 4, further comprising:
   a pair of side shields opposed to each other with the magnetic pole in between in the track width direction; and
   a pair of side gap layers provided between the magnetic pole and the pair of side shields.

7. A magnetic recording unit provided with a magnetic recording medium and a perpendicular magnetic recording head, the perpendicular magnetic recording head comprising:

a magnetic pole including an end surface exposed on an air bearing surface, and extending in a height direction perpendicular to the air bearing surface;

a leading shield including an end surface exposed on the air bearing surface;

a leading gap provided between the magnetic pole and the leading shield; and a recess shield including a mid-part and other parts, and provided at a position on a side opposite to the magnetic pole with the leading shield in between, the mid-part being distanced from the leading shield in a track width direction, the other parts being in contact with the leading shield, and the position being recessed from the air bearing surface, wherein the other parts of the recess shield are a pair of end parts opposed to each other with the mid-part in between in the track width direction.

* * * * *